US007161920B2

(12) United States Patent
Simonsen et al.

(10) Patent No.: US 7,161,920 B2
(45) Date of Patent: Jan. 9, 2007

(54) HIGH RATE, TIME DIVISION MULTIPLEXED, MULTI-MPSK MODEM WITH IMBEDDED HIGH SIGNAL-TO-NOISE RATIO TRACKING CHANNEL

(75) Inventors: Harold L. Simonsen, South Jordan, UT (US); Kent R. Bruening, Sandy, UT (US); Randal R. Sylvester, West Valley, UT (US)

(73) Assignee: L-3 Communications Corporation, New York, NY (US)

( * ) Notice: Subject to any disclaimer, the term of this patent is extended or adjusted under 35 U.S.C. 154(b) by 1025 days.

(21) Appl. No.: 10/292,141

(22) Filed: Nov. 12, 2002

(65) Prior Publication Data
US 2004/0090939 A1 May 13, 2004

(51) Int. Cl.
*H04Q 7/28* (2006.01)
*H04B 1/69* (2006.01)

(52) U.S. Cl. .................. 370/336; 370/208; 370/337; 370/442; 375/130; 375/131

(58) Field of Classification Search ............... 370/208, 370/336, 337, 347, 441, 442; 455/73, 102; 375/130, 140, 141, 146, 260, 261, 377
See application file for complete search history.

(56) References Cited
U.S. PATENT DOCUMENTS 5,103,459 A * 4/1992 Gilhousen et al. ......... 370/206
5,235,614 A * 8/1993 Bruckert et al. .......... 370/209
5,691,974 A * 11/1997 Zehavi et al. ............ 370/203
5,717,713 A * 2/1998 Natali ...................... 375/149
5,748,668 A * 5/1998 Tomita et al. ............. 375/130
6,173,007 B1 * 1/2001 Odenwalder et al. ...... 375/146
6,842,477 B1 * 1/2005 Odenwalder et al. ...... 375/146

* cited by examiner

*Primary Examiner*—Charles N. Appiah
(74) *Attorney, Agent, or Firm*—Perman & Green, LLP

(57) ABSTRACT

A novel MODEM and method of operating a MODEM usable in spread spectrum communication utilizing multiple waveforms in orthogonal spread signals imbeds a tracking signal in one of the spread signals for efficient tracking by a receiver so that both spread signals can have wideband characteristics. Therefore, one spread signal contains a tracking channel and a wideband channel, allowing for higher order modulation in the wideband channel for transmitting information, while still providing good tracking features. The second spread signal is an orthogonal wideband channel serving as the main high data rate conduit. In the preferred embodiment, the first portion of the waveform (in the first spread signal) is modulated using Bi-Bi-Phase Shift Keying (Bi-BPSK), while the second portion of the waveform (in the second spread signal) is modulated using Multiple Phase Shift Keying (MPSK). The two waveform portions are Time Division Multiplexed (TDM) at the chipping rate. A higher overall data bandwidth can be achieved for the Bi-BPSK modulation technique using the same channel bandwidth.

16 Claims, 4 Drawing Sheets

HIGH RATE, TIME DIVISION MULTIPLEXED, MULTI-MPSK MODEM WITH IMBEDDED HIGH SIGNAL-TO-NOISE RATIO TRACKING CHANNEL

BACKGROUND OF THE INVENTION

1. Field of the Invention

The present invention broadly relates to electronic communications-especially those where a signal (or related signals) is spread over a wide bandwidth and/or multiple channels. The present invention also relates to modulator-demodulators (MODEMS) used in such communications.

2. Brief Description of Related Developments

Spread spectrum communication is a wideband modulation technique that imparts noise-like characteristics to a Radio Frequency (RF) signal. Fundamentally, the transmitted signal is spread over a frequency much wider than the minimum bandwidth required to send the signal, resulting in an increased probability that the received information will be correct. The advantages of spread spectrum signals include difficulty (because they are noise-like) in detecting them by non-intended receivers, and a higher resistance to jamming.

The two basic requirements for signals to be part of a spread spectrum system are: 1) the transmitted signal bandwidth is much greater than the information bandwidth, and 2) some function other than the information being transmitted is utilized to determine the resultant transmitted bandwidth.

With the growth in use of spread spectrum systems has been the development of new variations. One variation of particular interest in the understanding of this Letters Patent is found in U.S. Pat. No. 5,559,788 (hereafter "'788 patent"), issued Sep. 24, 1996 in the name of John W. Zscheile, Jr. et al. for "Multiple Channel Quadrature Communication System and Method." The reader is referred to that document, which is hereby incorporated by reference.

The '788 patent describes a scheme for contemporaneously transmitting control signals and data signals over the same frequency band without duplicating receiver components or needing additional frequency allocations. Referred to in this Letters Patent as the "Bi—Bi-Phase Shift Keying" modulation approach, the '788 patent states in its Abstract:

A transmitter is provided which simultaneously transmits waveforms such as with different data rates. These transmissions are modulated (e.g., phase modulated) onto quadrature channels of a common carrier, and are then combined. The resulting composite modulated waveform is upconverted to RF, power amplified, split and routed to separate ports for transmission. The transmitted signals are then received, downconverted and demodulated to produce the original signals.

While the '788 provides improvements over the prior art Direct Sequence Spread Spectrum (DSSS) schemes, significant limitations remain when there is an attempt to offer high data rates in both of the orthogonal portions of the waveform. For example, when the two portions of the waveform are time division Bi-BPSK modulated using conventional high-gain Turbo Codes, and Multiple Phase Shift Key (MPSK) modulated, a high data rate in the Bi-BPSK portion leads to a low Signal-to-Noise (SNR), and hence a potential tracking problem in the receiver. This leads to a practical limitation on the data rate of the Bi-BPSK waveform portion that is lower than is desirable.

What is therefore highly desirable, but not addressed by the prior art is to provide a MODEM and communication scheme that combine the advantages of the '788 approach with the ability to transmit high data rates over both portions of the waveform, while maintaining excellent tracking by the receiver(s).

SUMMARY OF THE INVENTION

In view of the above-identified problems and limitations of the prior art, the present invention provides an apparatus in the nature of a MODEM, for communicating a waveform having a plurality of time division multiplexed signals. The apparatus at least includes a carrier generator adapted to generate a carrier signal, a pseudo-noise generator adapted to generate at least one pair of orthogonal pseudo-noise signals, and a tracking signal generator adapted to generate a tracking signal having a high signal-to-noise ratio relative to a first signal. The apparatus also at least includes a first combiner adapted to combine a first of the orthogonal pseudo-noise signal portions with the first signal to produce a first portion ("wideband channel") of the waveform as a first spread signal, the first signal having a wide frequency band relative to the tracking signal, and the first combiner also adapted to imbed the tracking signal ("tracking channel") in the first spread signal, the wideband and tracking channels being orthogonal, and a second combiner adapted to combine the second of the orthogonal pair of pseudo-noise signals with a second signal to produce a second spread signal portion of the waveform. The apparatus further at least includes a modulator adapted to modulate the carrier signal with first and second spread signals, which carrier signal is shifted in phase for the two spread signals to produce first and second modulated signals, and a third combiner adapted to combine the first and second modulated signals to produce a combined signal waveform.

The present invention also provides a method of communicating a waveform having a plurality of time division multiplexed signals. The method at least includes the steps of generating a carrier signal, generating at least one pair of orthogonal pseudo-noise signals, and generating a tracking signal having a high signal-to-noise ratio relative to a first signal. The method also at least includes the steps of combining a first of the orthogonal pseudo-noise signal portions with the first signal to produce a first portion ("wideband channel") of the waveform as a first spread signal, the first signal having a wide frequency band relative to the tracking signal, imbedding the tracking signal ("tracking channel") in the first spread signal, the wideband and tracking channels being orthogonal, and combining the second of the orthogonal pair of pseudo-noise signals with a second signal to produce a second spread signal. The method further at least includes the steps of modulating the carrier signal with first and second spread signals, which carrier signal is shifted in phase for the two spread signals to produce first and second modulated signals, and combining the first and second modulated signals to produce a combined signal waveform.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENT(s)

Figure 1:
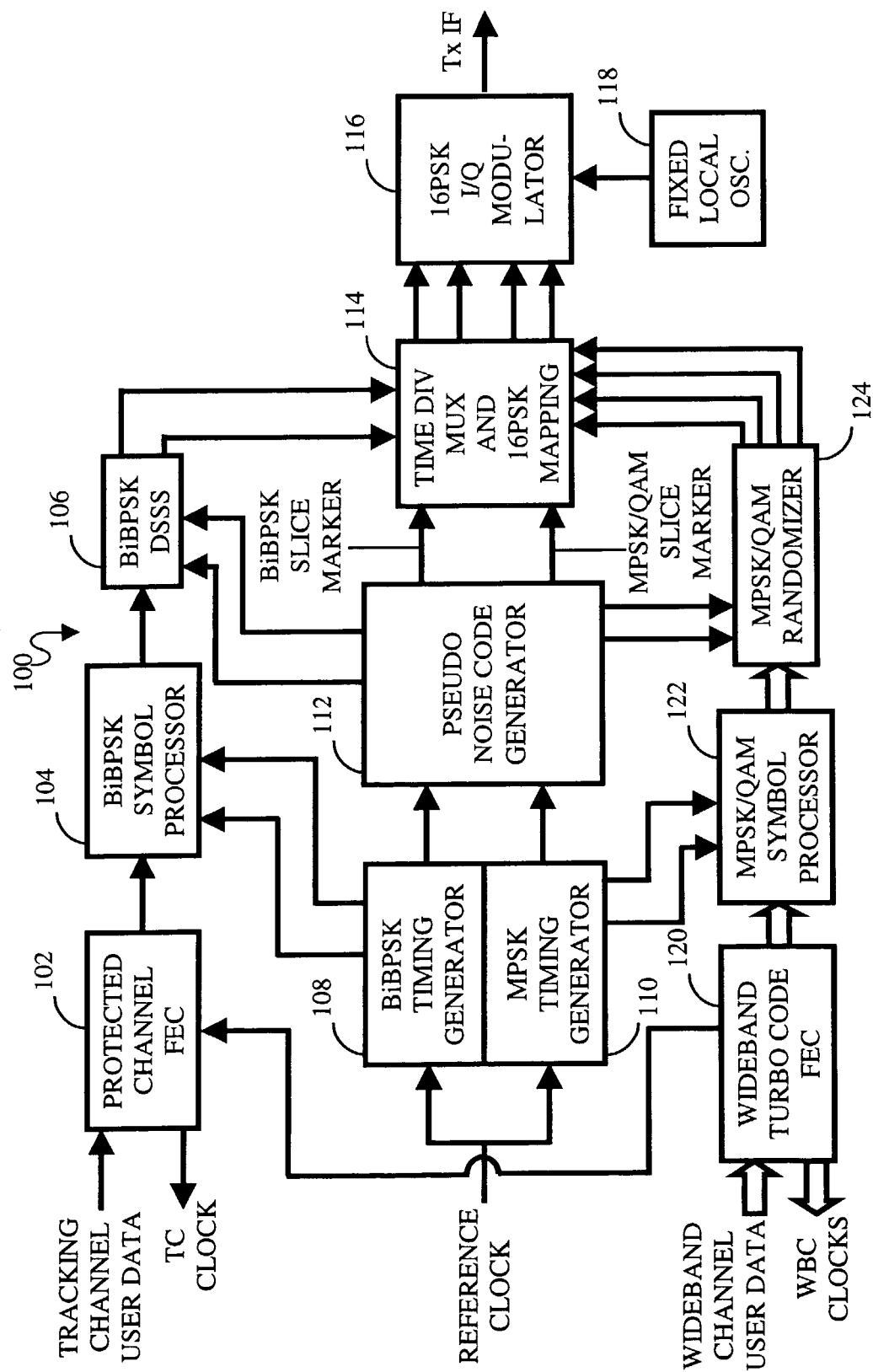
FIG. 1 is a general block diagram of a communication system utilizing a modulator constructed according to the present invention.
Figures 2A, 2B:
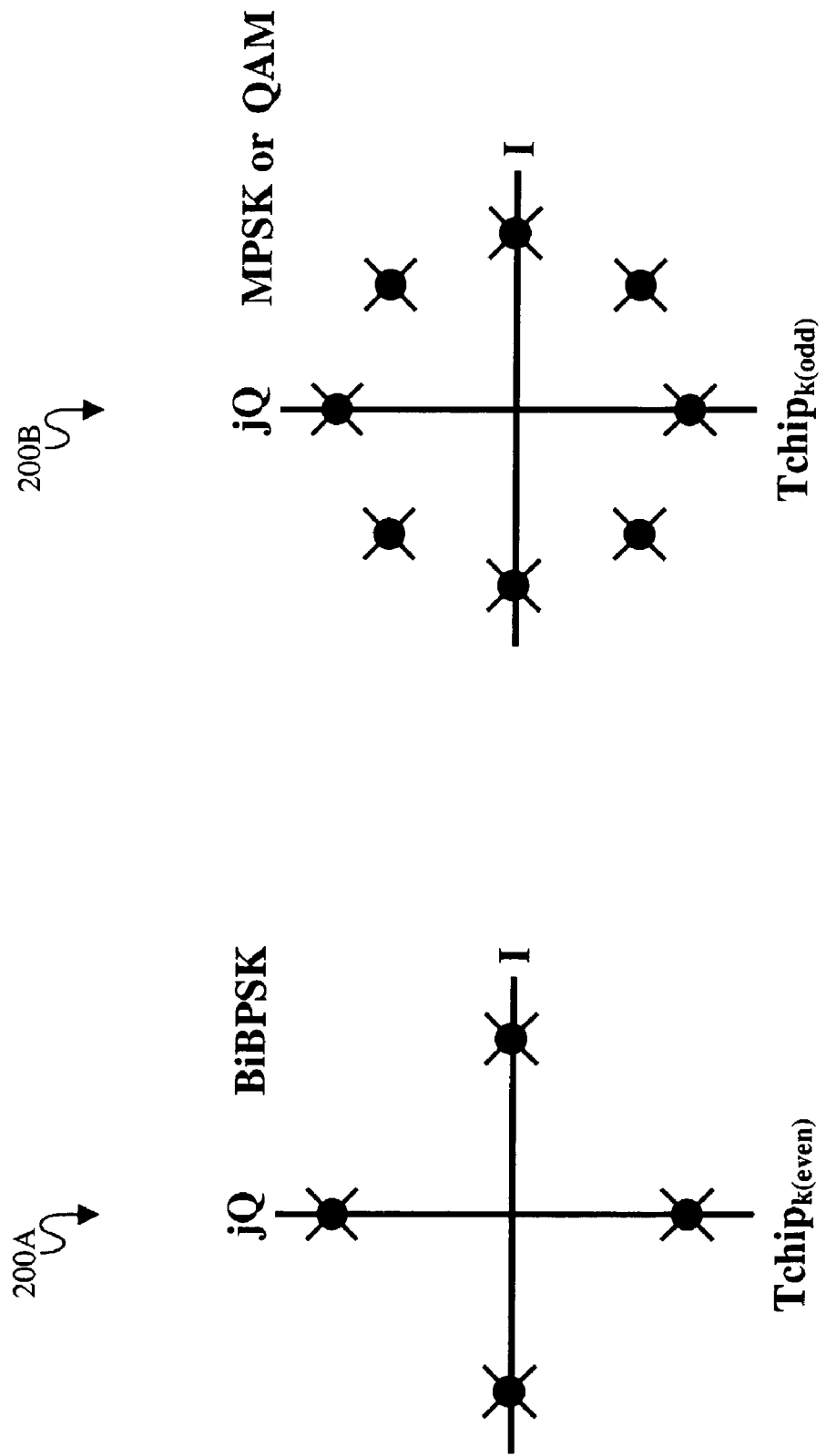
FIGS. 2A and 2B are an example of constellation diagrams for the case where the Bi-BPSK portion and the MPSK portion alternate every chip.

FIG. 1 is a schematic block diagram of the modulator portion 100 of a MODEM capable of practicing the present invention. Those skilled in the art to which the present invention pertains will appreciate that a demodulator is easily implemented, given the details of the modulator. The modulator 100 nominally includes the blocks shown, but can be varied without departing from the scope of the invention. The MODEM can be implemented using CMOS technology, or using Field Programmable Gate Arrays (FPGAs). However, it will be appreciated by those skilled in the art that the present-inventive MODEM can be implemented in other ways, including but not limited to, Application Specific Integrated Circuits (ASICs). In the preferred embodiment, the Bi-BPSK and MPSK portions are transmitted in alternating time slices as shown in the constellation diagrams of FIGS. 2A and 2B.

The modulator 100 processes the Bi-BPSK and MPSK channels in parallel as shown. The Bi-BPSK portion of the waveform novelly includes both a wideband channel and a tracking channel in an orthogonal relationship, as mentioned supra in the Summary Section. A protected channel forward error corrector 102 receives tracking channel user data and Turbo code information from a wideband turbo code forward error corrector 120. The protected channel forward error corrector (FEC) 102 also outputs a tracking channel clock signal.

The output of the protected channel FEC is supplied to the input of a Bi-BPSK symbol processor 104. Subsequently, the output of the Bi-BPSK symbol processor 104 is processed by a Bi-BPSK Direct Sequence Spread Spectrum unit 106.

Wideband channel user data is supplied to the wideband turbo code FEC 120, which is also responsible for outputting wideband channel clock signals. The output of the wideband turbo code FEC 120 is supplied to an MPSK/Quadrature Amplitude Modulation (QAM) symbol processor 122. Subsequently, the output of the MPSK/QAM symbol processor 122 is processed by an MPSK/QAM randomizer 124.

A reference clock signal is supplied both to a Bi-BPSK timing generator 108 and an MPSK timing generator 110. The timing generators 108 and 110 supply output signals to a pseudo-noise code generator 112, which generator 112 produces pseudo-noise codes for the Bi-BPSK DSSS and MPSK/QAM randomizer units 106 and 124, respectively. The output of the latter elements represents the spread signals. A time division multiplexer and 16PSK mapping unit 114 is responsible for outputting the spread signals in the appropriate time slice. The operation of the time division multiplexer and 16PSK mapping unit 114 is also synchronized to Bi-BPSK and MPSK/QAM slice markers as shown in the figure. It should be appreciated by those skilled in the art that other types of mapping units can be used, such as an 8PSK mapping unit.

Finally, a fixed local oscillator (LO) 118 is modulated by the spread signals from the time division multiplexer and 16PSK mapping unit 114 and a 16PSK I/Q modulator 116 to produce an intermediate frequency (IF) transmitted waveform. As is known in the art, the I and Q portions represent the unshifted and quadrature shifted portions of the waveform.

Figure 3:
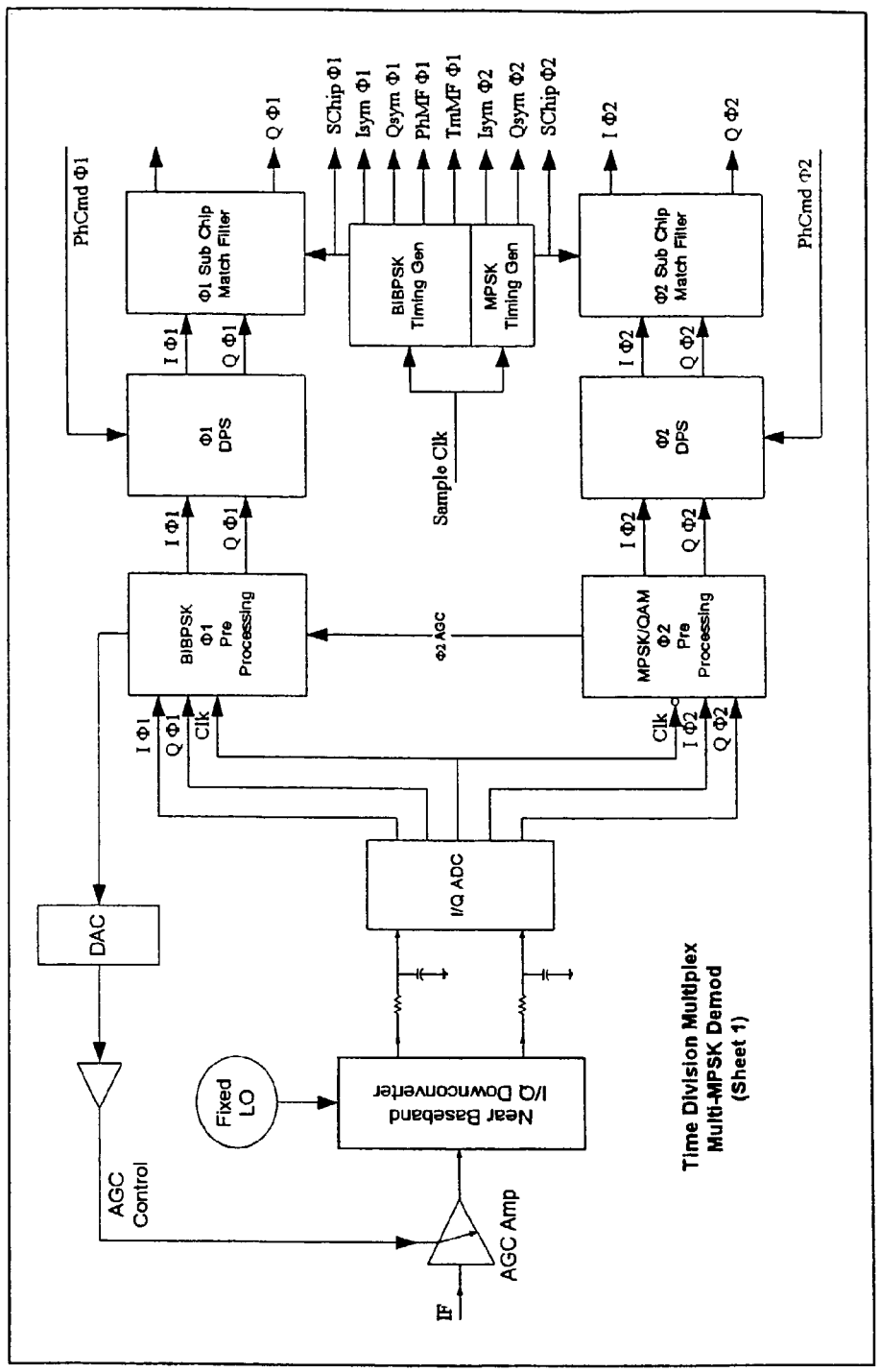
FIGS. 3 and 4 are block diagrams of embodiments of a demodulator portion of a system incorporating features of the present invention.
Figure 4:
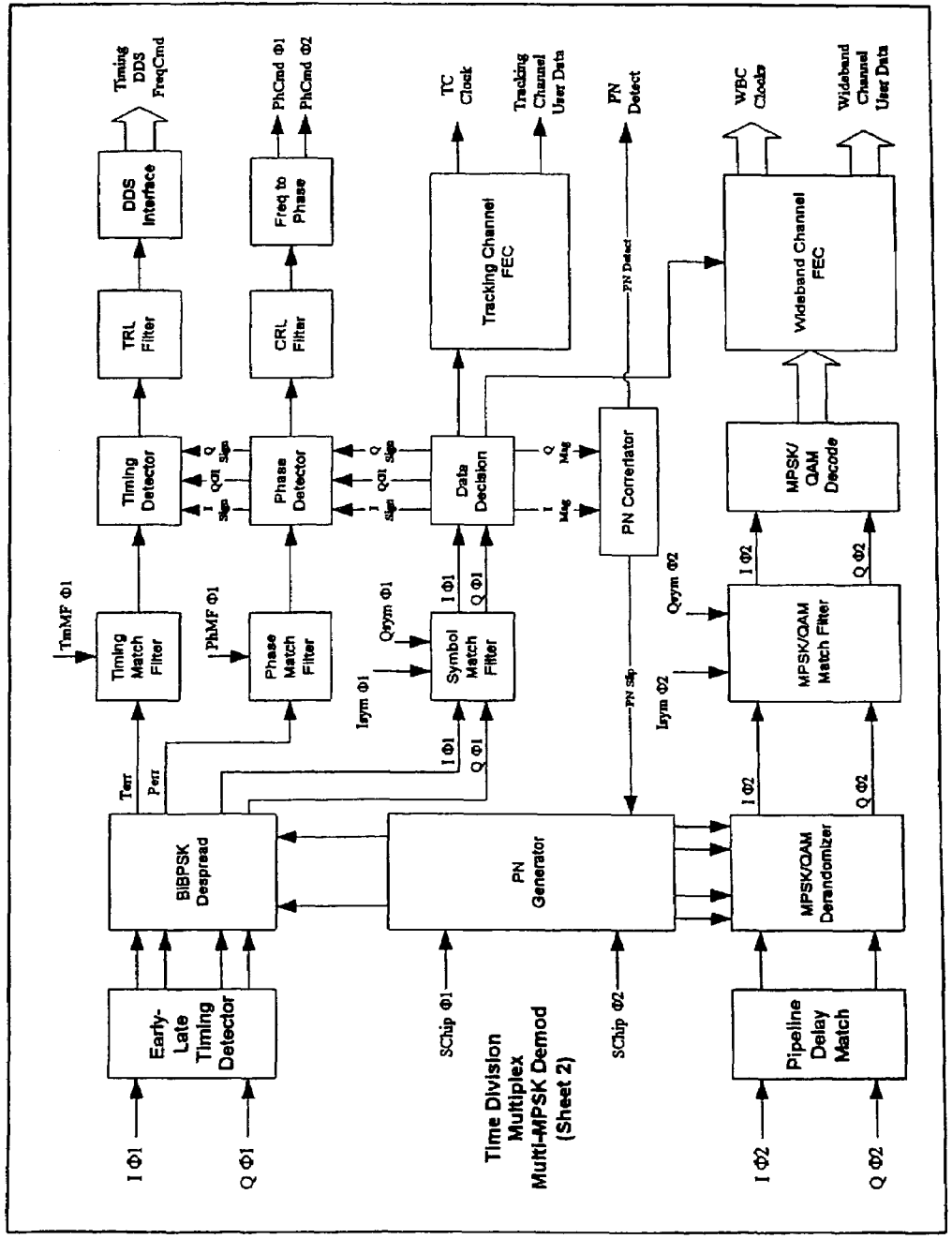

FIGS. 3 and 4 are illustrative of demodulator block diagrams for embodiments of the present invention. As shown in the demodulator block diagram of FIGS. 3 and 4, the TDM, Multi-MSPK demodulator architecture also leads to a parallel hardware implementation.

In the Bi-BPSK portion of the transmitted waveform, the novel inclusion of the tracking channel of the present invention allows for excellent tracking by a receiver, while still allowing the inclusion of a high data rate wideband channel having a low SNR. That is, the tracking channel has a high processing gain relative to the wideband channel. Other advantages of the present-inventive scheme include the fact that the tracking channel can also include system-critical information because of excellent bit error rate (BER) performance, and the jamming resistance qualities of such an arrangement. As a result of implementing the present invention, a higher overall data bandwidth can be achieved for the Bi-BPSK modulation technique using the same channel bandwidth.

Variations and modifications of the present invention are possible, given the above description. However, all variations and modifications which are obvious to those skilled in the art to which the present invention pertains are considered to be within the scope of the protection granted by this Letters Patent.

To wit, the waveform portions need not be transmitted during alternating time slices for the invention to be effective. For example, the Bi-BPSK portion of the waveform can be transmitted during every third time slice, etc., instead of every second time slice.

Also, a MODEM constructed according to the present invention can include dynamic bandwidth allocation in the Bi-BPSK waveform portion by adjusting the processing gain of the tracking and the wideband channels based upon real-time performance.

Further, other modulation techniques can be used in place of MPSK in the associated time slices. These include, inter alia, QAM and Trellis Coded Modulation (TCM).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. An apparatus for communicating a waveform having a plurality of time division multiplexed signals, said apparatus comprising:
   a carrier generator adapted to generate a carrier signal;
   a pseudo-noise generator adapted to generate at least one pair of orthogonal pseudo-noise signals;
   a tracking signal generator adapted to generate a tracking signal having a high signal-to-noise ratio relative to a first signal;
   a first combiner adapted to combine a first of said orthogonal pseudo-noise signal portions with said first signal to produce a first portion of said waveform as a first spread signal, said first signal having a wide frequency band relative to said tracking signal, and said first combiner also adapted to imbed said tracking signal in said first spread signal, said wideband and tracking channels being orthogonal;
   a second combiner adapted to combine the second of said orthogonal pair of pseudo-noise signals with a second signal to produce a second spread signal portion of said waveform;

a modulator adapted to modulate said carrier signal with first and second spread signals, which carrier signal is shifted in phase for the two spread signals to produce first and second modulated signals; and a third combiner adapted to combine said first and second modulated signals to produce a combined signal waveform.

2. The apparatus in claim 1, wherein said first and second spread signals are alternately transmitted in predetermined time slices.

3. The apparatus in claim 1, wherein said first spread signal is transmitted less than every other of predetermined time slices.

4. The apparatus in claim 1, wherein said first combiner comprises a dynamic bandwidth adjuster adapted to dynamically adjust the bandwidth of said wideband channel.

5. The apparatus in claim 1, wherein said second portion of said waveform is modulated using Multiple Phase Shift Keying (MPSK).

6. The apparatus in claim 1, wherein said second portion of said waveform is modulated using Quadrature Amplitude Modulation (QAM).

7. The apparatus in claim 1, wherein said second portion of said waveform is modulated using Trellis Coded Modulation (TCM).

8. The apparatus in claim 1, wherein said first portion of said waveform is modulated using Bi-Bi-Phase Shift Keying (Bi-BPSK).

9. A method of communicating a waveform having a plurality of time division multiplexed signals, said method comprising the steps of:

generating a carrier signal;

generating at least one pair of orthogonal pseudo-noise signals;

generating a tracking signal having a high signal-to-noise ratio relative to a first signal;

combining a first of said orthogonal pseudo-noise signal portions with said first signal to produce a first portion of said waveform as a first spread signal, said first signal having a wide frequency band relative to said tracking signal;

imbedding said tracking signal in said first spread signal, said wideband and tracking channels being orthogonal;

combining the second of said orthogonal pair of pseudo-noise signals with a second signal to produce a second spread signal;

modulating said carrier signal with first and second spread signals, which carrier signal is shifted in phase for the two spread signals to produce first and second modulated signals; and combining said first and second modulated signals to produce a combined signal waveform.

10. The method in claim 9, wherein said first and second spread signals are alternately transmitted in predetermined time slices.

11. The method in claim 9, wherein said first spread signal is transmitted less than every other of predetermined time slices.

12. The method in claim 9, wherein said first combiner comprises a dynamic bandwidth adjuster adapted to dynamically adjust the bandwidth of said wideband channel.

13. The method in claim 9, wherein said second portion of said waveform is modulated using Multiple Phase Shift Keying (MPSK).

14. The method in claim 9, wherein said second portion of said waveform is modulated using Quadrature Amplitude Modulation (QAM).

15. The method in claim 9, wherein said second portion of said waveform is modulated using Trellis Coded Modulation (TCM).

16. The method in claim 9, wherein said first portion of said waveform is modulated using Bi—Bi-Phase Shift Keying (Bi-BPSK).

* * * * *